Aug. 2, 1960 — E. R. ZIEGLER — 2,947,185
WINDSHIELD WIPER DRIVE MECHANISM
Filed April 7, 1958 — 2 Sheets-Sheet 2
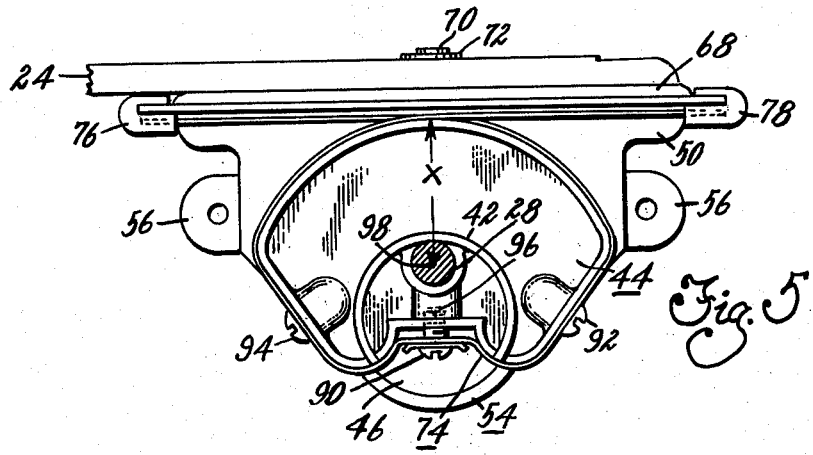
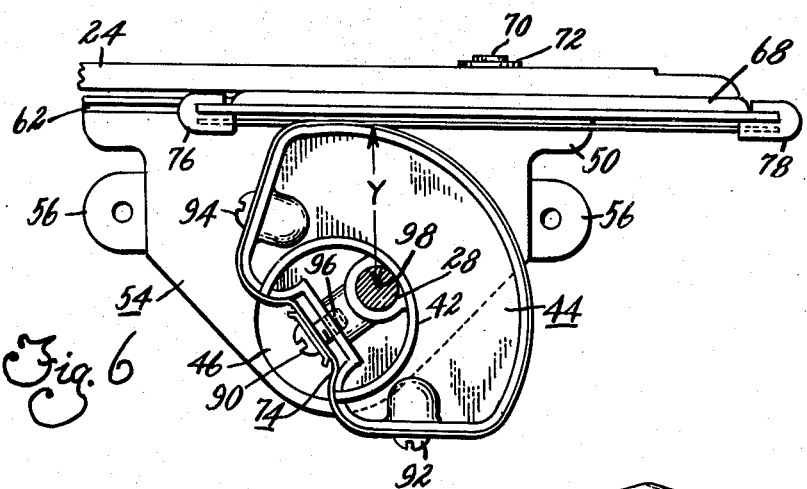
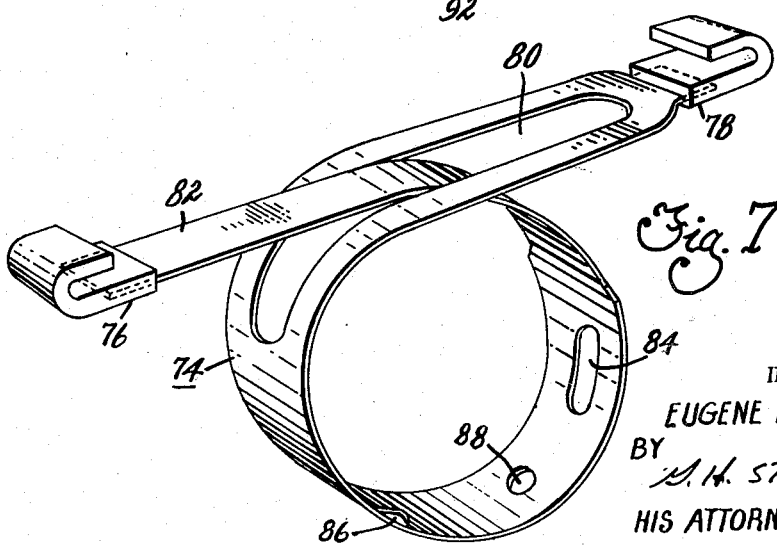
INVENTOR.
EUGENE R. ZIEGLER
BY
*H. H. Strickland*
HIS ATTORNEY United States Patent Office 2,947,185
Patented Aug. 2, 1960

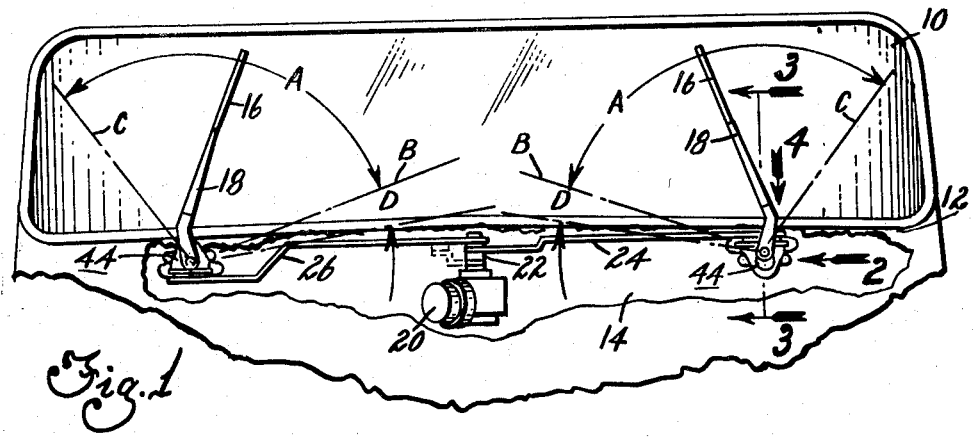

2,947,185
WINDSHIELD WIPER DRIVE MECHANISM
Eugene R. Ziegler, Spencerport, N.Y., assignor to General Motors Corporation, Detroit, Mich., a corporation of Delaware Filed Apr. 7, 1958, Ser. No. 726,931
12 Claims. (Cl. 74—95)

This invention pertains to the art of windshield cleaning, and particularly to an improved drive mechanism for windshield wipers.

Present linkage assemblies for actuating windshield wipers from a rotary crank, wherein the outer end of each link is pivotally connected to a wiper shaft crank, have the inherent disadvantage of accelerating and retarding the wiper shaft too quickly at the stroke ends. This results in noisy operation at high speeds and tends to produce undesirable overtravel at the stroke ends. This phenomenon results since the moment arm is longest at the center of the stroke and is shortest at the stroke ends. The present invention relates to an improved linkage drive arrangement wherein the moment arm is longest at the stroke ends and shortest at the center of the stroke thereby automatically reducing the angular velocity at the stroke ends of the wiper shaft. Accordingly, among my objects are the provision of a linkage drive for converting rotation to oscillation including eccentric means for automatically reducing the angular velocity of a wiper shaft adjacent the stroke ends thereof; the further provision of a windshield wiper linkage drive including an eccentric attached to a wiper shaft for varying the moment arm during oscillation thereof; and the still further provision of a windshield wiper linkage drive of the aforesaid type including flexible strip means for interconnecting a link and the wiper shaft carried eccentric.

The aforesaid and other objects are accomplished in the present invention by attaching an eccentric to a wiper shaft and interconnecting the eccentric and a drive link by a flexible metal strip. Specifically, the windshield wiper drive mechanism includes a rotary crank which may be driven by an electric motor. During normal running operation, the motor driven crank rotates about a fixed axis, and if desired, the position of the crank axis can be shifted to vary the throw of the crank and obtain depressed parking of the wiper blades. A crank assembly of this type is disclosed in copending application Serial No. 718,789, filed March 3, 1958, in the name of Contant et al. and assigned to the assignee of this invention.

The inner ends of the drive links are movably connected through ball and socket joints to the rotary crank. The outer end of one link is disposed beneath its wiper shaft and the outer end of the other link is disposed above its wiper shafts. Each wiper shaft is rotatably journalled in a stationary housing attached to the vehicle and has an eccentric fixedly secured to the inner end thereof. The axis of rotation of the wiper shaft is disposed between the periphery of the eccentric and the center thereof whereby the distance between the axis of the wiper shaft and the periphery of the eccentric, or moment arm, is shortest at the center of the wiping stroke and is longest at the stroke ends.

Each eccentric has an integral hub projection disposed within circular apertures of a cage thereby supporting the cage. A flexible metal strip is wrapped about the eccentric and securely attached thereto, opposite ends of the strip being anchored to a slide member mounted for reciprocable movement in the cage. The slide member is movably connected to the outer end of the drive link such that to and fro movement of the drive link effects reciprocation of the slide member. Reciprocation of the slide member, in turn, oscillates the eccentric and the wiper shaft. During oscillation of the eccentric, the cage has imparted thereto a slight swinging movement. This drive mechanism results in a progressive reduction in the angular velocity of the wiper shaft adjacent the stroke ends, and in this respect the present invention constitutes an improvement over the mechanism disclosed in abandoned application Serial No. 665,448, filed June 13, 1957, in the name of Blazey et al and assigned to the assignee of this invention.

Further objects and advantages of the present invention will be apparent from the following description, reference being had to the accompanying drawings, wherein a preferred embodiment of the present invention is clearly shown.

In the drawings:

Figure 1 is a fragmentary view, in elevation, of a motor vehicle with certain parts broken away, equipped with the windshielf wiper drive mechanism of this invention.

Figure 2 is an enlarged fragmentary view in elevation, taken in the direction of arrow 2 of Figure 1.

Figure 3 is an enlarged sectional view taken along line 3—3 of Figure 1.

Figure 4 is an enlarged fragmentary view taken in the direction of arrow 4 or Figure 1.

Figure 5 is a view, partly in section and partly in elevation, taken along line 5—5 of Figure 2 with one side of the cage removed and the wiper shaft at the center of its stroke.

Figure 6 is a view similar to Figure 5 with the wiper shaft at one of its stroke ends.

Figure 7 is a perspective view of the flexible metal strip for interconnecting the slide member and the eccentric.

With particular reference to Figure 1, a vehicle is shown including a windshield 10, a cowl 12 and a firewall 14. The vehicle is equipped with a pair of spaced wiper assemblies comprising wiper blades 16 carried by arms 18 which are movable over asymmetrical paths across the outer surface of the windshield 10. During normal running operation, the wiper blades 16 are oscillated throughout an angle A between an inboard stroke end position indicated by broken line B and an outboard stroke end position indicated by broken line C. The wiper blades 16 can also be moved to a depressed parked position throughout an angle D from the inboard stroke end position when the wiper motor is deenergized.

The wiper arm and blade assemblies may be actuated by an electric motor 20, suitably attached to the firewall 14, which drives a rotary crank assembly 22. The inner ends of rigid drive links 24 and 26 are movably connected through ball and socket joints to the crank assembly 22 such that upon rotation of the crank assembly 22 the links 24 and 26 will have imparted thereto to and fro motion. The outer end of drive link 24 is drivingly connected with the right hand wiper blade and arm assembly and is disposed above the axis of the wiper arm shaft. The outer end of drive link 26 is operatively connected with the left hand wiper blade and arm assembly and is disposed beneath the wiper arm shaft.

With particular reference to Figures 2 through 4, the mechanism for interconnecting the outer ends of the drive links with their respective wiper shafts will be described. Each wiper arm 18 is drivingly connected to a wiper shaft 28 rotatably journalled by spaced bushings 30 and 32 in a housing 34 which is rigidly attached to the vehicle firewall 14 by such means as bolts 36. The housing 34 extends through an aperture in the cowl 12 and is secured in fixed relation thereto by a spanner nut 38 which threadedly engages a portion of the housing 34. The inner end of each wiper shaft 28 is serrated, as indicated by numeral 40 and a hub portion 42 of a plastic eccentric 44 is molded onto the serrated portion 40. Accordingly, the eccentric 44 is rigidly attached to the shaft 28 for movement therewith about the axis of the shaft 28. The hub portion 42 of the eccentric 44 extends through circular apertures 46 and 48 in spaced plates 50 and 52 respectively, which plates constitute a cage generally indicated by the numeral 54, which partially encloses the eccentric 44. As seen in Figure 2, the plates 50 and 52 have flanged side wall portions 56 and 58 respectively which are connected by rivets 60. In addition, the plates 50 and 52 are formed with channels 62 and 64, respectively, for supporting a slide member 68 likewise composed of suitable plastic material.

The intermediate portion of the slide member 68 has an upstanding pin 70 to which the outer end of the drive link 24 is pivotally connected. The drive links are attached to the pins 70 by snap rings 72. Accordingly, upon to and fro movement of the drive links the slide members 68 will reciprocate relative to their cages 54.

The slide member 68 is drivingly connected with the eccentric 44 by a flexible steel strip 74, as shown in Figure 7. The flexible steel strip 74 has anchoring lugs 76 and 78 secured to each end thereof, such as by casting them in place, and the wide end portion is formed with an elongated longitudinal slot 80 through which the narrow end portion 82 of the strip 74 extends. In addition, the strip 74 is formed with a pair of elongated longitudinal slots 84 and 86 disposed on opposite sides of a circular hole 88.

Opposite ends of the slide member 68 are received by the anchoring lugs 76 and 78 of the strip 74, as shown in Figures 4 through 6. The intermediate portion of the flexible strip 74 encompasses the periphery of the eccentric 44 and the requisite tension in the strip 74 is obtained by a screw 90 which extends through the circular hole 88 and is threaded into the hub 42 of the eccentric. After the strip 74 is properly tensioned, the strip is anchored to the eccentric by a pair of screws 92 and 94 which extend through holes 84 and 86 respectively in the strip and threadedly engage the eccentric 44.

With particular reference to Figures 5 and 6, the center of the arcuate periphery of the eccentric 44 is indicated by numeral 96, and the axis of the wiper shaft 28 is indicated by numeral 98. Thus, it is readily apparent that the axis of the wiper shaft 28 is disposed between the periphery of the eccentric 44 and the center thereof. The eccentric shaft, cage and slide member mechanism for the left hand wiper assembly of Figure 1 is inverted with respect to the right hand assembly depicted in Figures 5 and 6. Thus, the distance between the axis 98 of the shaft 28 and the periphery of the eccentric 44 will be shortest midway between the stroke ends of movement imparted to the shaft 28 as depicted by the line X in Figure 5. Moreover, this distance, or moment arm, will progressively increase as the shaft 28 is oscillated to either side of the midposition, and the distance will be a maximum at the stroke ends such as indicated by Y in Figure 6. This progressive variation in the length of the moment arm will result in a progressive reduction in the angular velocity of the wiper shaft 28 adjacent the stroke ends.

In operation, upon energization of the motor 20 so as to impart rotation to the crank assembly 22, the drive links 24 and 26 will have imparted thereto to and fro movement. The to and from movement of the drive links 24 will effect reciprocation of the slide members 68. Reciprocation of the slide members 68 will pull one end or the other of the flexible strips so as to oscillate the eccentrics and the wiper shafts about the axis of the wiper shafts. Oscillation of the eccentrics will result in a slight swinging movement being imparted to the cages 54, and it is for this reason that the inner ends of the drive links 24 and 26 are interconnected with the crank assembly 22 by ball and socket joints so as to permit limited universal movement therebetween. The resulting oscillation imparted to the wiper shafts and the wiper blades and arms carried thereby will have minimum angular velocity at the stroke ends thereby reducing the abruptness of movement reversals and reducing the noise of operation at high speed.

While the embodiment of the invention as herein disclosed constitutes a preferred form, it is to be understood that other forms might be adopted.

What is claimed is as follows:

1. A windshield wiper drive including in combination, a rotary driving crank, a link having one end movably connected with said crank and movable to and fro upon rotation thereof, a stationary housing, an oscillatable shaft journalled in said housing, an eccentric attached to said wiper shaft for oscillation therewith about the axis of said wiper shaft, the axis of said wiper shaft being disposed between the periphery of said eccentric and the center thereof, a cage supported by said eccentric, a member supported for reciprocable movement in said cage and operatively connected to the other end of said link, and means interconnecting said member and said eccentric whereby to and fro movement of said link reciprocates said member to oscillate said eccentric and said shaft.

2. A windshield wiper drive including in combination, a rotary driving crank, a link having one end movably connected to said crank, an oscillatable wiper shaft, a housing rotatably supporting said wiper shaft, an eccentric attached to said wiper shaft for oscillation therewith about the axis of said wiper shaft, the axis of said wiper shaft being disposed between the periphery of said eccentric and the center thereof, said eccentric having a hub, a cage supported by said hub, a member slidably supported in said cage and pivotally connected to the other end of said link, and a flexible strip having its opposite ends anchored to said member and its intermediate portion attached to said eccentric for oscillating said eccentric and said shaft upon rotation of said crank.

3. A windshield wiper drive including in combination, a rotary driving crank, a link having one end movably connected to said crank, an oscillatable wiper shaft, means rotatably supporting said wiper shaft, an eccentric attached to said wiper shaft for oscillation therewith about the axis of said wiper shaft, the axis of said wiper shaft being disposed between the periphery of said eccentric and the center thereof, a cage supported by said eccentric, and means including a member supported for reciprocable movement in said cage operatively interconnecting the other end of said link and said eccentric whereby rotation of said crank will oscillate said eccentric and said wiper shaft.

4. A windshield wiper drive including in combination, a rotary driving crank, a link having one end movably connected to said crank, an oscillatable wiper shaft, means rotatably supporting said wiper shaft, an eccentric attached to said wiper shaft for oscillation therewith, about the axis of said wiper shaft, the axis of said wipe shaft being disposed between the periphery of said eccentric and the center thereof, a cage supported by said eccentric, a member supported for reciprocable movement in said cage and operatively connected to the other end of said link, and a flexible strip having opposite ends anchored to said member and its intermediate portion attached to said eccentric for oscillating said eccentric and said shaft upon rotation of said crank.

5. A windshield wiper drive including in combination, a rotary driving crank, a link having one end movably connected to said crank, a stationary housing, an oscillatable shaft journalled in said housing, an eccentric attached to said wiper shaft for oscillation therewith about the axis of said wiper shaft, the axis of said wiper shaft being disposed between the periphery of said eccentric and the center thereof, said eccentric having a hub, a cage supported by said hub and at least partially enclosing said eccentric, said cage having spaced channeled portions, a member slidably received in the spaced channeled portions of said cage, means pivotally interconnecting the other end of said link and said member, and a flexible strip having its opposite ends anchored to said slidable member and its intermediate portion attached to said eccentric for oscillating said eccentric upon rotation of said crank.

6. The windshield wiper drive set forth in claim 5 wherein one end portion of said flexible strip has an elongated slot therein through which the other end portion of said flexible strip extends.

7. The windshield wiper drive set forth in claim 5 wherein said strip has U-shaped anchoring lugs at opposite ends thereof for receiving the ends of said slidable member, and wherein said flexible strip is tensioned by its attachment to said eccentric.

8. The windshield wiper drive set forth in claim 5 wherein said cage comprises a pair of plates disposed on opposite sides of said eccentric and means rigidly connecting said plates.

9. The windshield wiper drive set forth in claim 5 wherein the means interconnecting said slidable member and the other end of said link comprises a pin enabling pivotal movement of said link relative to said slidable member.

10. A windshield wiper drive including in combination, a rotary driving crank, a link having one end pivotally connected to said crank, a stationary housing, an oscillatable wiper shaft journalled in said housing, an eccentric attached to said wiper shaft for oscillation therewith about the axis of said wiper shaft, the axis of said wiper shaft being disposed between the periphery of said eccentric and the center thereof, said eccentric having a hub, a cage supported by said hub comprising a pair of spaced interconnected plates having inwardly facing channelled portions, a reciprocable slide member supported by said channelled portions, means pivotally connecting the other end of said link and said slide member, and a flexible metal strip having its opposite ends anchored to said slide member and its intermediate portion attached to said eccentric for oscillating said eccentric upon reciprocation of said slide member due to rotation of said crank.

11. The drive set forth in claim 10 wherein said eccentric has a peripheral recess, and a screw threaded device engaging said flexible metal strip and said eccentric for drawing said strip into said recess to thereby tension the strip.

12. A windshield wiper drive including in combination, a wiper motor, an oscillatable wiper shaft, an eccentric member attached to said shaft for oscillation therewith about the axis of said shaft, the axis of said wiper shaft being disposed between the periphery of said eccentric member and the center thereof, cage means supported by said eccentric member, a rigid reciprocating member supported for to and fro movement in said cage means and adapted for connection with said wiper motor, and flexible means interconnecting said rigid reciprocating member and said eccentric member whereby to and fro movement of said rigid member will impart oscillation to said eccentric member and said shaft.

References Cited in the file of this patent

UNITED STATES PATENTS

| 2,404,639 | Lane | July 23, 1946 |
| 2,559,208 | Zaiger | June 3, 1951 |
| 2,760,221 | Hitzelberger | Aug. 28, 1956 |

FOREIGN PATENTS

| 482,958 | France | Feb. 20, 1917 |
| 678,333 | France | Dec. 1, 1929 |
| 324,782 | Great Britain | Feb. 6, 1930 |
| 806,257 | Germany | June 14, 1951 |